April 2, 1940. H. W. JONES ET AL 2,195,728
MULTISTAGE REGULATOR
Filed June 30, 1937 2 Sheets-Sheet 2
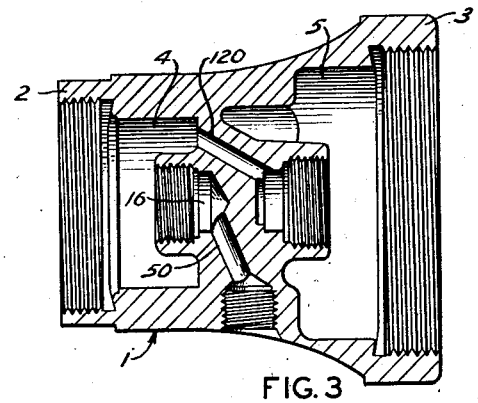
FIG. 3
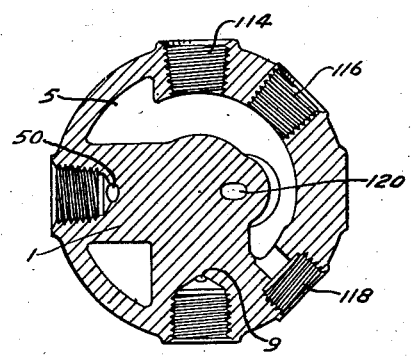
FIG. 4
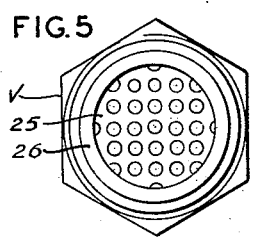
FIG. 5
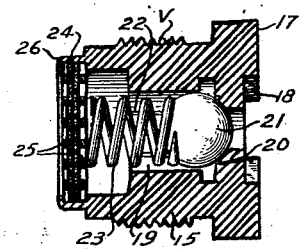
FIG. 7
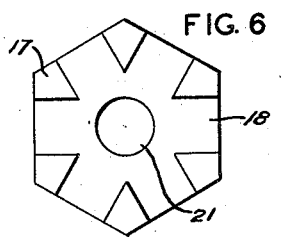
FIG. 6
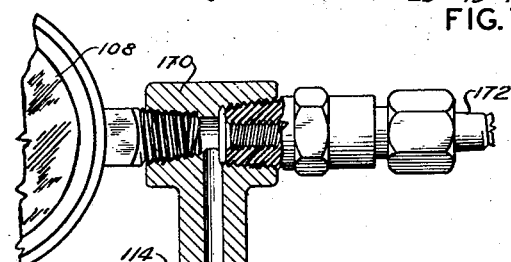
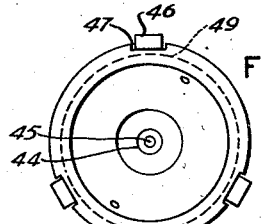
FIG. 10
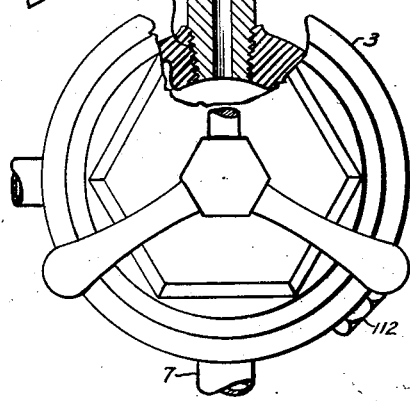
FIG. 11
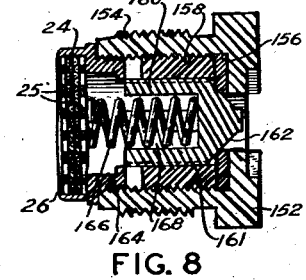
FIG. 8
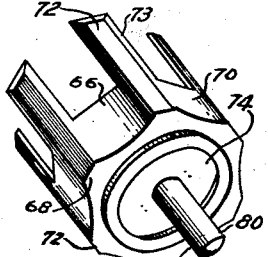
FIG. 14
INVENTORS
HOMER W. JONES
WILGOT J. JACOBSSON
BY E. L. Greenewald
ATTORNEY Patented Apr. 2, 1940

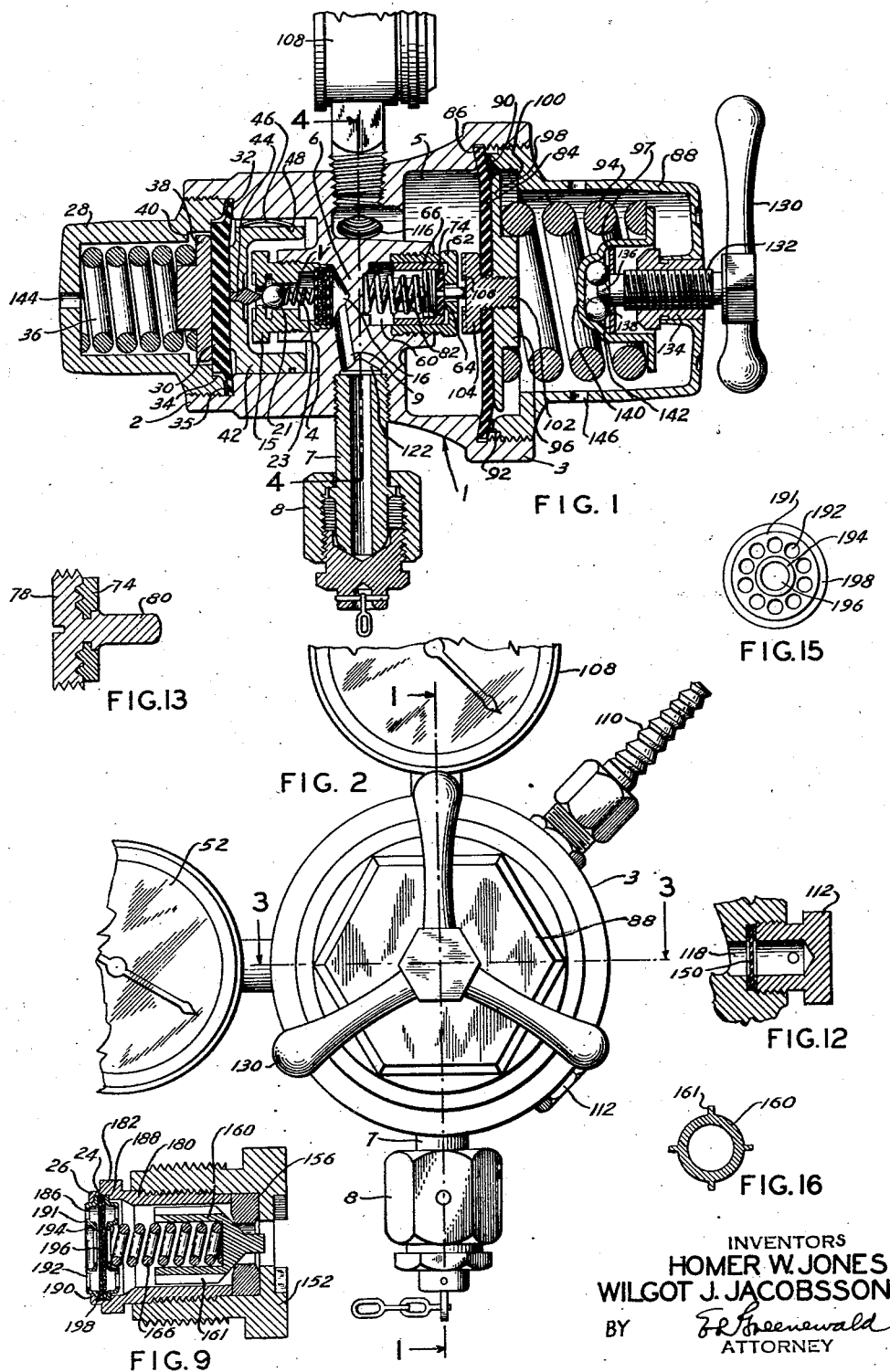

2,195,728

UNITED STATES PATENT OFFICE 2,195,728

MULTISTAGE REGULATOR

Homer W. Jones, Westfield, and Wilgot J. Jacobsson, Scotch Plains, N. J., assignors to Oxweld Acetylene Company, a corporation of West Virginia Application June 30, 1937, Serial No. 151,150

16 Claims. (Cl. 50—23)

This invention relates to pressure regulating and reducing apparatus of unitary construction adapted for reducing the pressure of highly compressed gases in a plurality of stages. It is especially adapted for use in gas welding and cutting operations.

Among the more important objects of the invention are: to provide a two-stage regulator having a unitary casing adapted to be produced from pressure forgings; to provide a novel unitary multistage pressure regulator providing accurate and constant pressure regulation over a large range of working pressures; to provide a novel first-stage valve, spring, and filter assembly replaceable as a unit; to provide in novel manner for utilizing an all-metal valve and seat assembly in the first stage of a two-stage pressure regulator; to provide in the second stage of such pressure regulator a diaphragm plate capable of functioning as a rupture disc to relieve any excessive pressure within the low-pressure chamber; and to provide novel wear-resistant pressure-adjusting means for the second stage valve-opening spring.

These and other objects will be apparent from the following description of the invention illustrated in the accompanying drawings, wherein:

Fig. 1 is a longitudinal section through the regulator along the line 1—1 of Fig. 2, looking in the direction of the arrows; parts being broken away, and other parts being shown in full;

Fig. 2 is an end view of the regulator of Fig. 1, parts being broken away;

Fig. 3 is a longitudinal section through the one-piece valve body, taken along the line 3—3 of Fig. 2, looking in the direction of the arrows; parts being omitted;

Fig. 4 is a transverse section, through the one-piece body taken along the lines 4—4 of Fig. 1;

Figs. 5 and 6 respectively are views of opposite ends of the first-stage valve assembly; and Fig. 7 is a longitudinal section through the first-stage valve assembly;

Fig. 8 is a longitudinal section through another form of first-stage valve assembly;

Fig. 9 is a longitudinal section through still another form of first-stage valve assembly;

Fig. 10 is an end view of a diaphragm sleeve assembly;

Fig. 11 is an end view of a modified form of the regulator and associated parts;

Fig. 12 is a section through a pressure relief valve and associated parts;

Fig. 13 is a section through a second-stage valve seat and associated parts;

Fig. 14 is a perspective view of the second-stage valve seat holder and associated parts;

Fig. 15 is a front view of a modified form of screen-reinforcing member; and

Fig. 16 is a transverse section through the midportion of the valve shown in Fig. 9.

Referring to the drawings, the regulator includes a body 1 which is circular in cross-section, with tapering side walls, and has internally-threaded annular rims 2 and 3 at its opposite ends. The body 1 preferably is made of a tough pressure-forged metal to insure a strong gas-tight structure free from blowholes.

The body 1 is provided with central cavities or chambers 4, 5 at its respective ends, which chambers are in axial alignment with each other and are disposed axially of the said body. The chambers are connected by an open passage 120 extending through a relatively thick transverse partition 6, formed integral with the said body, and otherwise separating these chambers. An inlet nipple 7,—adapted to have its free end connected with the outlet from a gas tank or other source of supply, as by means of the union coupling 8,—is connected with a port 122 in the body midway of its length. The port communicates with the chamber 4 through passage 9 and a valve assembly V.

The valve assembly V illustrated in Figs. 1 and 7 includes a valve seat bushing or retainer 15 having a portion of its external surface threaded to cooperate with a threaded portion of a central cavity or socket 16 in the partition. The bushing 15 has an end enlarged and provided with a flat face 17 having therein transverse grooves 18. A longitudinal passage 19 extends through the bushing 15, which passage has a portion thereof of reduced cross-section adjacent the face 17, providing a margin having an annular seat portion 20, preferably of a soft metal such as brass, and adapted to function as a seat for a ball valve 21 of hard corrosion-resistant metal such as stainless steel. The ball is guided within the passage 19 by means of spaced internal longitudinal ribs 22 formed in the bushing 15; and is urged into sealing engagement with the margin 20 by means of a coil spring 23 operatively interposed between and bearing against the ball 21 and a screen assembly of fine-mesh screens 24 housed between perforated metal reinforcing members 25 which also protect the screens from injury by spring 23. The assembly of screens and supporting members are secured within the bushing 15 by the flanged margins 26 of the latter.

For assisting to force the valve 21 from its seat during use there is provided a hollow metal cap 28 having a margin externally threaded to cooperate with an internal thread on the rim 2. A relatively thick flexible molded diaphragm 30, preferably of gum rubber composition lacking the usual fabric reinforcement, and having a thick central boss or cushion and an annular marginal shoulder 32 adjacent its outer margin, has the outer marginal portion clamped between the cap 28 and an internal shoulder 34 on the body 1. A metal gasket 35 is disposed between the diaphragm and the cap. The possibility of gas leakage at the juncture between rubber and fabric, often encountered with the usual rubber diaphragms, thus is eliminated.

A coil spring 36 is housed within the cap 28, being operatively compressed between the back of the cap and a thick metal diaphragm plate 38. Movement of the plate 38 in one direction is limited by an internal shoulder 40 in the cap 28, and in the other direction by the limit of the path of travel of a hollow cup-shaped drag sleeve 42 mounted for free longitudinal sliding movement within the chamber 4. The member 42 has a flat midportion in contact with the diaphragm 30, the said midportion being slightly less in area than the area of the diaphragm plate 38 in contact with the diaphragm. A drag sleeve stem or pin 44 of hard metal such as Monel metal is mounted centrally of the sleeve 42, and has an inwardly extending tapered portion provided with a flat end surface adapted to contact with the ball valve 21 under action of the spring 36.

To prevent vibration and resultant humming of valve 21, three spaced curved leaf springs or friction elements 46 of resilient metal are mounted on the outer periphery of the sleeve 42 in slots 47. Each spring 46 has a curved end 48 adapted to rest in an annular groove 49 provided therefor in the outer wall of the drag sleeve. The midportion of each spring presses against the inner surface of the side wall of chamber 4. A conduit 50 connects the cavity 16 with a pressure gauge 52 threadedly secured in an aperture in the midportion of the side wall of the body 1.

The second stage of the regulator embodies the chamber 5 having a well or socket 60 drilled centrally in the bottom wall formed by the partition 6. Threadedly secured within the upper end of this well 60 is a cup-shaped nozzle member 62, preferably plated with chromium or other hard metal, and having a central aperture in its closed end, surrounded by a sloping internal wall 64 providing a gas-tight seating surface. Mounted within the well 60 between the base thereof and the nozzle 62, for longitudinal sliding movement, is a valve seat assembly which includes a hollow tubular valve seat holder 66, preferably plated like nozzle 62, and having a central aperture in its forward face 68. The holder is generally hexagonal in cross section,—having flat side walls 70 respectively separated by narrow side wall areas 72 that contact the wall of the well and the internal surface of the nozzle member 62 for longitudinal sliding movement. The major portion of the walls 70 rearwardly of the face 68 are cut away, thus minimizing the weight of the same but leaving areas 73 in the form of rearwardly extending prongs which may be sprung outwardly to adjust the friction exerted by them upon the adjacent surfaces of the well 60 and member 62, and eliminate valve vibration and humming. Secured within the aperture in the face 68 is a readily removable unit including an annular valve seat 74 of deformable material, such as soft rubber or like composition, molded or otherwise bonded to a metal seat-supporting member, having an enlarged head 78 adapted to be threadedly secured within the holder, with the seat 74 extending within the aperture in face 68. The seat-supporting member has a short stem 80 extending through the annular seat 74 and through and beyond the central aperture in the nozzle 62; and its free end is rounded. The seat 74 preferably is supported in all directions to prevent distortion during use. A series of annular grooves in the head 78 serves to maintain the rubber in place during the molding and vulcanizing operations, and later, during use. A compression spring 82 is operatively interposed between the bottom of a cavity in the base of well 60 and the enlarged end 78 of the seat-supporting member.

The outer margin of chamber 5 is closed by a diaphragm 84, preferably of soft gum rubber unreinforced by any woven fabric, which is secured in place between a bevelled internal shoulder 86 within the chamber 5 and the adjacent margin of a metal cap or housing 88 which is threadedly secured to an internally-threaded marginal portion of the body 1. A diaphragm gasket 90 of metal is placed between the cap and the diaphragm 84. The outer peripheral margin of the cap has an annular groove 92 therein; and the internal wall of the cap adjacent this groove is bevelled similar to shoulder 86, and then curves inwardly away from the diaphragm to prevent injury to the latter. Mounted within the cap 88 is a pressure-adjusting spring 94 operatively interposed between an extremely large diaphragm plate 96 and a spring cap and ball-bearing housing member 97, having a flanged margin adapted to rest freely upon the spring.

The diaphragm plate 96 is made of relatively brittle bronze die casting, and has formed therein a thin, peripheral zone 98 adapted to be ruptured by excessive pressure within the chamber 5 for relieving such pressure, in the event of gas leakage at the second-stage valve. The path of movement of the plate 96 is limited in one direction by an internal shoulder 100 in the wall of the cap 88. A diaphragm-clamping screw 102 is threadedly secured to the center of the diaphragm plate 96, and has a flattened head 104. The diaphragm 84 is secured between the head 104 and the plate 96. The outer face of the flattened head has intersecting grooves 106 therein extending entirely across the same. This face is adapted under certain conditions to engage the adjacent outer face of the nozzle member 62 while maintaining free communication between the chamber 5 and the aperture in the nozzle 62. The rounded free end of the stem 80 is adapted under certain conditions to engage the center of the adjacent face of the diaphragm-clamping screw 102.

For compressing the spring 94 in manner to distribute the pressure thereof centrally of the diaphragm plate, there is provided a pressure-adjusting screw handle 130 of hardened alloy such as stainless steel, having a threaded stem 132 cooperating with an internally-threaded bushing 134, preferably of a hard metal or alloy such as "Everdur." The said bushing is pressed or otherwise detachably mounted in a central aperture in the cap 88. The stem 132 has a tapered end portion, the tapered surface 136 of which is curvilinear to fit and cooperate with each of a series of three or more ball bearings 138 supported for free movement within a pocket 140 in the spring cap 97. Preferably three balls are used, and are maintained in the pocket or race 140 by the annular collar 142.

The usual apertures 144, 146 are provided in the respective caps 28 and 88 to permit free access to the atmosphere.

A low pressure gauge 108, a low pressure gas outlet 110, and a pressure relief valve 112 of well-known construction are mounted at spaced points upon the side wall of the body 1 in the same general transverse plane, and are in communication with the low pressure chamber 5 through the respective ports 114, 116 and 118.

The relief valve 112 consists of the usual threaded plug member screwed into the body 1 at the port 118 and securing between it and the said body a gas-impervious metal diaphragm 150 adapted to rupture and permit escape of gas when pressures above a selected maximum are reached in chamber 5.

Fig. 8 illustrates a modified first-stage valve assembly wherein a valve seat of a hard material such as horn, or a relatively hard plastic composition is used in place of a metal seat. In this modification, a valve seat bushing 152 is used which is generally similar to the bushing 15, excepting that the side walls 154 are thinner and are internally threaded. An annular seating member 156 of hard composition or the like is secured within the bushing by a threaded sleeve 158 cooperating with threads on the interior surface of the member 152. The free end of the sleeve is slotted for insertion of a tightening tool. A hollow valve 160 of annular cross section having spaced longitudinal guiding ribs 161 formed on its outer peripheral surface and having a tapered seating surface 162 is mounted for free sliding movement within the sleeve 158. A screen-carrying and reinforcing member 164 is secured to the bushing 152 by a threaded portion of its external surface cooperating with internal threads on the bushing. The member 164 has a thin-walled flange portion rigidly securing a plurality of alternate fine-mesh screens 24 and perforated reinforcing members 25 between the said flange and a shoulder formed in the member 164. A coil compression spring 166 is operatively interposed between the inner surface of the innermost member 25 and the valve 160 and extends within a recess 168 within the latter. The spring normally urges the bevelled valve sealing surface against the valve seat. The member 152 and parts carried thereby are assembled as a unit and are introduced as such within the chamber 4 of the regulator.

Fig. 9 illustrates still another modification of first stage valve assembly, which is similar in general to that shown in Fig. 8, but differs from the latter in utilizing a unitary screen-supporting and valve-seat securing sleeve or member 180 in place of the sleeve 158 and the screen-carrying member 164. The outer end or head of the member 180 is enlarged and may be provided with a hexagonal head 182 for convenience in assembling the valve unit. The member 180 is bevelled internally near the head end. A pair of opposed screen-reinforcing members 186 of metal having therebetween one or more fine-mesh screens 24 are secured within the member 180 between an internal shoulder 188 and a flanged lip 190. Each of the members or discs 186 has an annular raised midportion or rib 191 provided with a plurality of apertures 192; an inner flanged portion 194 surrounding a single aperture 196; and an outer flanged portion 198 adapted to be clamped between the shoulder 188 and flange 190. The flanged portion 194 houses and prevents lateral movement of one end of the spring 166. By opposing two of these discs 186, an extremely rigid screen-protecting structure in thus provided. The other parts of the valve-screen assembly are similar to those shown in Fig. 8.

Fig. 11 illustrates a modification of the invention in which a single port in the side of the regulator body 1 serves both as a low pressure gauge port and as a low pressure gas outlet. A T fitting 170 is connected with port 114; and the port 116 can be eliminated, blanked off, or used as a second fluid outlet. An outlet line 172 leads from the T.

The diameter of the chamber 5 of the low-pressure stage, the effective area of the diaphragm 84, and the spring 94 associated therewith, are larger than the corresponding elements of the intermediate-pressure stage, in order to maintain a highly accurate regulation of the pressure in the low-pressure stage while keeping the overall size of the regulator at a minimum.

When not in operation, the diaphragm springs 36 and 94 force the respective first and second-stage valves off their seats, which movement is opposed by the springs 23 and 82. In this position the central inner portion of the drag sleeve 42 contacts the top surface of the valve bushing 15 and prevents undue distortion of the diaphragm by limiting its forward movement. Likewise the grooved face of diaphragm clamping screw 102 then rests upon the outer surface of nozzle member 62 and prevents undue distortion of diaphragm 84 under action of spring 94.

Upon the introduction of high pressure gas to the regulator through the inlet line 7, it enters chamber 4 until the pressure therein acting upon the drag sleeve, augmented by the pressure of the spring 23, is sufficient to overcome the force of the spring 36, whereupon the drag sleeve and diaphragm move to release valve 21 which then closes. The gas pressure required for this purpose will vary with the operating characteristics of spring 36, the design and size of diaphragm plate 38, and upon other factors.

The gas under pressure then flows from chamber 4 to chamber 5 until the pressure within the latter acting upon diaphragm 84, together with the force exerted by spring 82 is sufficient to overcome the force of the adjustable spring 94, whereupon the second stage valve closes.

The diaphragm spring 36 of the first stage is designed to reduce the gas pressure to a relatively uniform intermediate pressure which exceeds the maximum pressure to be delivered by the low-pressure stage. Preferably this intermediate pressure is maintained as low as possible in order to maintain a constant delivery pressure from the second stage over as wide as possible a range of cylinder pressures. The diaphragm associated with the first stage valve is made small in size to prevent an excessive total load being placed thereon in the event that, due to a leaky first-stage valve, full cylinder pressure is exerted upon the diaphragm.

The pressure maintained in the intermediate-pressure chamber 4 may be varied by substituting for spring 36 a spring of different characteristics or size.

During operation, as the pressure at the source of gas supply gradually diminishes during discharge of the gas, the force of the pressure upon the ball in the first-stage valve gradually is taken up by the spring 36. Therefore the pressure maintained in the intermediate-pressure chamber gradually increases with falling supply pressure, for a given spring 36. However, such pressure variations in the intermediate-pressure stage are not sufficient to affect the accuracy of regulation of the low-pressure stage valve.

The present two-stage regulator is especially adapted for use in the pressure regulation of combustible gases and of high-pressure oxygen, such as the gases used in gas welding and metal-cutting operations. By its use pressure fluctuations during gas welding and cutting operations when one or more torch valves are opened or closed are substantially eliminated.

In operation, with the regulator connected to a source of high pressure gas, when a pressure drop occurs in chamber 5 due to withdrawal of gas through outlet 110, the now unbalanced forces acting on diaphragm 84 cause it to move to open the low-pressure stage valve. Gas entering chamber 5 past this valve reduces the pressure in chamber 4; and the resultant unbalancing of the forces acting on diaphragm 30 causes the latter to force the pin 44 against the first-stage valve and move the latter from its seat until suitable pressure is again built up in chamber 4 by incoming gas through inlet 7.

Diaphragms of molded rubber which are free from fabric reinforcing preferably are used. The usual fabric-reinforced rubber has the objectionable property often encountered of developing just sufficient gas leakage through the porous fabric to permit channeling by the gas and escape thereof around the edge of the diaphragm, with resultant loss of pressure.

The respective diaphragm plates 38 and 96 have diameters but slightly less than those of the caps in which they are movable, so that under the action of the maximum forces acting in the chambers 4 and 5, the unreinforced rubber of the diaphragm cannot flow into the space between these plates and the cap wall in amount sufficient to weaken the diaphragm or interfere with its proper functioning. Thus is obtained, too, the maximum effective diaphragm area possible within the diameter of the body 1.

The ball-type of valve used in the first regulation stage has a much longer life in service for regulating high-pressure gases than do the usual stem-type and nozzle-types valves. However, it is more difficult to insure at all times a uniform accurate seating of ball-type valves. Particles of scale and the like when caught between the valve and its seat seriously interfere with its operation, as also do changes in the direction or the point of application on the ball of the valve-operating forces. To insure proper functioning of the first-stage valve at all times, the quickly removable valve assembly shown in Figs. 5 to 8, and hereinbefore described, is employed. The screens therein prevent access of scale and the like to the metal ball-valve; and factory assembly of the sealed unit insures that the sensitive valve parts will not be injured or their interrelationship modified, accidentally or otherwise, while in service in the field.

By constructing the two-stage regulator of this invention with a unitary body having the two chambers 4, 5 and the sockets 16, 60 located axially thereof in alignment with each other and disposed centrally of the said body, it has become possible to make the body from a pressure forging of great strength and readily produced free from defects. The first-stage valve unit includes a metal holder having a metal or a composition seat, within which holder is assembled a metal ball valve, a spring, and a screen filter unit. This assembly is readily removable as a unit for cleaning.

The second-stage valve is of the inverse nozzle-type, and has a soft rubber seat molded to a metal screw which is inserted into a holder having free sliding contact with a portion of the nozzle acting as the seat and holder guide. The nozzle has a polished surface of a hard metal such as chromium, to insure smooth operation of the valve and to reduce to a minimum friction between the nozzle and the seat holder 66.

In the event of slight leakage of the first-stage valve, the regulator continues to function for the intended purpose. However, the first-stage valve unit can quickly and readily be removed, and another unit substituted therefor. No calibration of the new unit is necessary.

The novel first-stage diaphragm of vulcanized rubber composition having the thin, narrow outer margin or clamping portion possesses the important advantages not only of being highly resistant to gas leakage when exposed to high pressures but also of being readily and uniformly produced by either continuous or intermittent molding and vulcanizing operations. Since in the vulcanizing operation, any internal strains in the rubber composition are released and dissipated, these molded diaphragms normally are long lived and provide excellent fluid-tight seals. For most services it is preferred that the ratio between the thickness of the cushioning midportion of the diaphragm and that of the thin annular marginal clamping portion be within the range from 2:1 to 4:1; that the maximum thickness of the cushioning portion be about ¼ inch; and that the minimum thickness of the annular margin be about $\frac{1}{16}$ inch. Molded diaphragms having their parts thus proportioned apparently are substantially free from injurious internal strains such as might result where a large volume of rubber was caused to flow under the action of high clamping pressures or of high fluid pressures in the intermediate pressure chamber. Obviously this diaphragm is adapted for use with fluid pressure regulators in general, but is of especial utility in the first stage of two-stage pressure regulators.

The invention is susceptible of modification within the scope of the appended claims.

We claim:

1. A valve assembly comprising a hollow bushing having a port at one end; a valve within said bushing and controlling said port; a filter and filter-reinforcing unit secured at the other end of said bushing, the said unit including at least two perforated metal members each having an annular reinforcing rib and a central spring well, and a screen interposed between said ribbed members; and a spring within said bushing and having an end housed within said spring well and normally pressing said valve against its seat to close said port.

2. A valve assembly comprising a casing; a chamber within the casing; an inlet passage in the casing connected with the chamber; a bushing removably secured in the passage and having a nozzle port at one end; a valve seat; a valve seat holder slidably mounted within said bushing; a combined valve seat support and valve-opening member removably and adjustably associated with the said holder; and resilient means pressing the valve seat upon the said nozzle port.

3. A valve assembly comprising a valve body having a cavity therein; a socket formed in said cavity; a hollow bushing in the said cavity and having a port at one end; a valve seat holder slidably mounted within the said bushing; a valve seat support carried by said holder and adjustable longitudinally thereof, the said support having a valve seat cooperating with said bushing to control said port and having a pressure-transmitting member extending through said port; and means for exerting pressure upon the last-named member, the said means including a member establishing permanent communication between said port and said cavity; and a spring operatively interposed between the base of said socket and said seat support.

4. Valve assembly as defined in claim 3, wherein the said seat holder is provided with longitudinal frictional elements.

5. Valve assembly as defined in claim 3, wherein the valve seat support, valve seat and said pressure-transmitting member are removable from said holder as a unit.

6. Valve assembly as defined in claim 3, wherein the valve seat support, valve seat and said pressure-transmitting member are removable from said holder as a unit, and wherein the said seat is molded in place upon said support.

7. Fluid pressure regulator comprising a casing; a cavity therein; a flexible diaphragm forming with said cavity a chamber; inlet and outlet passages respectively connected with said chamber; a valve and a valve seat controlling the flow of gas through said inlet passage; a spring housing; a spring operatively interposed between said spring housing and said diaphragm; and means for adjusting and uniformly distributing pressure applied to said spring, the last-named means including a spring cap and ball race, at least three ball bearings in said race, and an adjusting screw having a curvilinear bearing surface cooperating with each of said bearings.

8. Regulator as defined in claim 7, wherein an adjusting screw bushing is removably mounted in said cap, and wherein the bearing surface of said adjusting screw is constructed of hardened metal.

9. A unitary valve assembly comprising a hollow bushing having a port at one end; a valve within said bushing and controlling said port; a valve seat removably mounted within said bushing at the said port; a filter and filter-reinforcing unit mounted on the said bushing, the said unit including at least two perforated metal members each having a reinforcing rib and a spring well, and a screen interposed between said ribbed members; a hollow tubular member having a central passage and adapted to adjustably secure the said seat to the bushing and having annular means associated therewith for securing the said ribbed members and screen in place extending across said passage; and a spring within said bushing and operatively interposed between the spring well in one of said ribbed members and the said valve.

10. A unitary valve assembly comprising a hollow bushing having a port at one end; a valve within said bushing and controlling said port; a removable valve seat mounted within said bushing and cooperating with said valve; a filter and filter-reinforcing unit secured at the other end of said bushing and adjustable as a unit longitudinally of the latter; the said unit including an internal sleeve having a portion pressingly engaging the said valve seat for securing the latter in operative position within the said bushing; at least two perforated metal members secured to said sleeve, and a screen operatively interposed between said perforated members; and a spring within said bushing and operatively interposed between said valve and said perforated members and normally pressing said valve against said seat to close said port.

11. A unitary valve assembly comprising a hollow bushing having a port at one end; a valve within said bushing and controlling said port; a valve seat within said bushing at said port; a filter and filter-reinforcing unit mounted in said bushing, the said unit including at least two perforate metal members, each having a reinforcing rib and a spring well, and a screen interposed between said ribbed members; and a spring within said bushing and operatively interposed between the spring well in one of said ribbed members and said valve.

12. A unitary valve assembly comprising a hollow bushing having a port at one end; a ball-type valve within said bushing and controlling said port; a valve seat within said bushing at said port; valve guides associated with the said bushing; a filter and filter-reinforcing unit supported by said bushing, the said unit including at least two perforate metal members, each having a reinforcing rib and a spring well, and a screen interposed between said ribbed members; and a spring within said bushing and operatively interposed between the spring well in one of said ribbed members and said valve.

13. A unitary valve assembly comprising a hollow bushing having a port at one end; a valve within said bushing and controlling said port; a valve seat removably mounted within said bushing at said port; a removable filter and filter-reinforcing unit carried by said bushing, the said unit including adjustable means for securing said valve seat upon said bushing, at least two perforate metal members, a screen interposed between said perforate members, and means removably mounted upon said bushing for securing together said perforate members and screen at their respective margins; and a spring within said bushing and operatively interposed between one of said perforate members and said valve.

14. A unitary valve assembly comprising a hollow bushing having a port at one end; a valve within said bushing and controlling said port; a filter and filter-reinforcing unit secured at the other end of said bushing, the said unit including screen-reinforcing means having an annular reinforcing rib and a spring well, and a screen secured against said means; and a spring within said bushing and having an end housed within said spring well and normally pressing said valve against its seat to close said port.

15. A unitary valve assembly as defined in claim 14 wherein said screen and screen-reinforcing means are removable as a unit from said bushing.

16. A pressure regulator, comprising a body having a cavity therein provided with an inlet and an outlet; a socket formed in said cavity and establishing communication between said inlet and said outlet; a valve assembly within said socket and removable therefrom as a unit, said assembly comprising a hollow bushing having a port at one end; a valve within said bushing and controlling said port; a filter and filter-reinforcing unit secured at the other end of said bushing, the last-named unit including means having an annular reinforcing rib and a spring well, and a screen secured against said means; a spring within said bushing and having an end housed within said spring well and normally pressing said valve against its seat to close said port; a diaphragm and spring-pressed diaphragm plate; and a floating pressure-transmitting member slidably mounted in said cavity and operatively interposed between said diaphragm and said valve, said floating member having resilient vibration-dampening means operatively associated therewith.

HOMER W. JONES.
WILGOT J. JACOBSSON.